United States Patent [19]

Zeigler

[11] E Patent Number: Re. 33,710

[45] Reissued Date of Patent: Oct. 8, 1991

[54] PORTABLE SHELTER ASSEMBLIES

[75] Inventor: Theodore R. Zeigler, 205 South Columbus St., Alexandria, Va. 22314

[73] Assignee: World Shelters, Inc., Springfield, Va.

[21] Appl. No.: 400,677

[22] Filed: Aug. 30, 1989

Related U.S. Patent Documents

Reissue of:

[64] Patent No.: 4,689,932
Issued: Sep. 1, 1987
Appl. No.: 795,534
Filed: Nov. 6, 1985

[51] Int. Cl.[5] ..... E04H 12/00

[52] U.S. Cl. ..... 52/648; 52/109; 52/649; 52/81

[58] Field of Search ..... 52/646, 648, 109, 80, 52/81, 86; 446/124, 126

[56] References Cited

U.S. PATENT DOCUMENTS

| | | |
|---|---|---|
| 39,721 | 9/1863 | Cross . |
| 101,165 | 3/1870 | Rodgers . |
| 402,755 | 5/1889 | Lyon . |
| 538,093 | 4/1895 | Weston . |
| 607,933 | 7/1898 | Laird . |
| 609,553 | 8/1898 | Lloyd . |
| 931,529 | 8/1909 | Vaghi . |
| 1,177,949 | 4/1916 | Homme . |
| 1,376,937 | 5/1921 | Hervieu et al. . |
| 1,819,490 | 8/1931 | Weiss . |
| 2,962,034 | 11/1960 | Finlayson . |
| 3,375,624 | 4/1968 | Mikulin . |
| 3,469,687 | 2/1970 | Greenberg et al. . |
| 3,559,353 | 2/1971 | Partridge . |
| 3,773,061 | 11/1973 | Berger . |
| 3,830,031 | 8/1974 | Soisson . |
| 3,889,433 | 6/1975 | Eubank, Jr. . |
| 4,074,477 | 2/1978 | Runyon . |
| 4,156,433 | 5/1979 | Beaulieu . |
| 4,241,746 | 12/1980 | Rothe . |
| 4,253,284 | 3/1981 | Bliss . |
| 4,393,887 | 7/1983 | Orobin . |
| 4,437,275 | 3/1984 | Zeigler . |
| 4,580,375 | 4/1986 | Nodskov et al. . |
| 4,607,656 | 8/1986 | Carter . |
| 4,745,725 | 5/1988 | Onoda . |

FOREIGN PATENT DOCUMENTS

| | | | |
|---|---|---|---|
| 562741 | 12/1957 | Belgium | 52/648 |
| 582289 | 9/1959 | Canada . | |
| 957819 | 11/1974 | Canada | 52/646 |
| 0064176 | 10/1982 | European Pat. Off. . | |
| 2322987 | 12/1973 | Fed. Rep. of Germany . | |
| 374427 | 4/1973 | U.S.S.R. . | |
| 511411 | 8/1939 | United Kingdom . | |

*Primary Examiner*—Richard E. Chilcot, Jr.
*Attorney, Agent, or Firm*—Merchant, Gould, Smith, Edell, Welter & Schmidt

[57] ABSTRACT

A portable shelter framework is formed by a series of end-interconnected modules, each defining a separate arch portion of the framework extending in different directions relative to each other. Each module is formed of elongate struts capable of being expanded into arched three dimensional form and collapsed into bundled form.

80 Claims, 7 Drawing Sheets

PORTABLE SHELTER ASSEMBLIES

Matter enclosed in heavy brackets [ ] appears in the original patent but forms no part of this reissue specification; matter printed in italics indicates the additions made by reissue.

BACKGROUND OF THE INVENTION

In my prior U.S. Pat. Nos. 3,968,808; 4,026,313; 4,290,244; and 4,437,275 various portable shelters are disclosed. In my U.S. Pat. No. 3,968,808, a generally semi-spherical framework made of elongate struts and hub means is disclosed which is movable between a collapsed, bundled condition in which the struts are closely bunched and in generally parallel relation and an expanded condition of three dimensional form. As disclosed, such structural frameworks are self-supporting by virtue of self-locking action, particularly with relation to the modules thereof. This self-locking action is achieved, within a module, by an asymmetrical disposition of those struts which extend inwardly from the crossed pairs of struts defining the peripheral sides of the module. In addition to this asymmetry to achieve the self-locking action, the necessary and sufficient condition for the capability for collapsing as well as expanding is that the sum of the distances from one of a pair of corresponding hub means along a strut to its pivotal connection with a crossing strut and back along the crossing strut to the other of the hub means is a constant value for all pairs of pivotally crossing or scissored struts connected to each pair of inner and outer hub means.

In the U.S. Pat. No. 3,968,808, domes, cylinders and modules are disclosed and in the dome structures, the framework is based upon a spherical icosahedron as defined by Buckminster Fuller and one face of which is illustrated in FIGS. 25 and 27 of that patent. By causing a zone of sliding connections in the framework, as for example as indicated at 110 in FIG. 1, three forms of maximum, though incomplete, possible triangular packing within an icosahedron face are disclosed in FIGS. 25 and 27. The incomplete triangular packing is self evident in FIG. 25 whereas in FIG. 27, either the crossed pair of struts 344 or the two crossed pairs of struts 340 and 342 are left out in order to attain the expandable/collapsible framework with the aforesaid zone 110 of sliding connections between crossed struts.

In my U.S. Pat. No. 4,026,313, the full triangular packing of each icosahedron face is made possible by providing alternate zones 18 and 20 of sliding and pivoted connections as shown in FIG. 1 of that patent. For a cylindrical framework, the alternate zones are shown at 62 and 64 in FIG. 2. FIGS. 10–12A illustrate rectangular modules of the general type which may be employed in this invention. U.S. Pat. Nos. 4,290,244 and 4,437,275 are divisions of U.S. Pat. No. 4,026,313 and are directed to modules per se and/or to a module or an assembly of modules in the form of a panel thereof, respectively. Modules such as these may be employed in this invention, although as will be pointed out hereinafter, any module format which is capable of expanding to three dimensional form and collapsing into a bundle is usable in this invention.

[It will be noted that in all of the dome or cylinder structures as disclosed in the aforesaid patents, although it is possible to achieve full triangulation, it is not possible to achieve pivotal connection between all of the pairs of crossed struts due to the necessity for providing the zone or zones of sliding connections.

In all of the dome or cylinder framework structures of the above prior patents, movement from the collapsed condition to the expanded condition involves expansion of the base of the structure from the bundled condition outwardly toward and finally to the fully expanded position of the base. Conversely, when the structure is collapsed, the base retreats inwardly from the fully expanded position to the bundled condition. Expansion or collapse is effected by pushing upwardly on the center of the structure or pulling downwardly on the center of the structure, respectively.

Thus, expansion and collapse in such frameworks occurs progressively within the framework and, more particularly, either expansion or collapsing commences predominantly at the top interior of the framework and expands outwardly therefrom toward the base of the framework, the base dimension in the expanded condition representing the maximum position to which the base expands or from which it retreats.]

In my aforesaid prior patents, as in this invention, the framework is covered with flexible covering material to provide a shelter function.

BRIEF SUMMARY OF THE INVENTION

The invention disclosed herein basically differs from the structures of the patents of the prior art in that the geometry thereof allows the structure a wide latitude of different configuration. That is, structures of this invention may take many and different forms by the use of different patterns of basic module configurations. By "module" as used herein, is meant any form of expandable/collapsible module which is of three dimensional form when expanded and is of bundled form when collapsed, whether module is of the self-locking type or not.

This invention involves a framework comprised of interconnected modules and which is capable of being manipulated between expanded, fully arched form and collapsed, bundled form by the expedient of flattening separate arch-like series or strings of end-connected modules of the framework so that their ends are beyond the positions thereof which support the framework when in expanded, fully arched condition.

This invention is based upon a rhombicuboctrahedron. Such as solid has eighteen square faces and eight equilateral triangle faces, a total of twenty six faces in all. Although the complete solid may be made in accord with this invention, in the preferred arrangement the bottom pyramid consisting of five square faces and four triangular faces is omitted. Of the remaining faces, it is preferred that two different module forms be employed which, as herein termed are transition modules and flat modules. These two modules are arranged in a basic pattern to simulate faces of the rhombicuboctrahedron. The top central region of the basic rhombicuboctrahedron defines a horizontally disposed flat module of square shape which is bounded on all four of its sides by downwardly arching transition modules with two sides of each triangular face being defined between adjacent sides of the bounding transition modules. In the girthwise direction, the vertically disposed faces are defined alternately by flat modules and transition modules, the flat modules being end-connected to lower ends of the bounding transition modules and further transition modules fill in between such flat modules but in rotationally oriented positions so that their ends join the sides of the girthwise extending flat modules. As noted, adjacent sides of the bounding transition modules define two sides of each triangular face and the base of each triangular face is defined by a further transition module. From this basic arrangement the controlled addition of modules permits the basic rhombicuboctrahedron to be dimensionally increased in three mutually orthogonal directions, i.e. in height, in width and in length.

It should be noted that not all of the modules defining the girthwise faces of the basic rhombicuboctrahedron need be employed. Thus one or modules may be omitted to provide entrance openings, as desired. When varying the dimensions of the basic rhombioctahedron, thus providing another shape, transition module means and square modules are added as necessary and desired.

Thus, in contrast to my prior patents where the domes and cylinders may not be basically varied as to shape, a feature of this invention is that the dimensions of the shelter may be controlled individually. That is, for a dome or cylinder of my prior patents, if the interior height is desired to be increased, the base dimension must also be increased commensurately. With this invention, the height may be increased without increasing the base dimensions; the base dimensions may be increased without increasing the height; and the base dimensions may be increased individually (both width and length).

Another feature of this invention is the formation of a shelter framework assembly of the type generally described above in which the framework is separated or is separable from the base upwardly to the corners of the top central regions. This leads not only to the dimensionally independent feature noted above but also to an entirely different mode of collapsing and expansion.

Stated otherwise, the invention involves a collapsible/expandable framework comprised of interconnected rectangular modules wherein certain modules forming the framework are either separate or are separable from each other to provide ar allow splitting of the expanded framework from the base upwardly therefrom, providing not only the capability for structuring the framework in many different forms but also providing a unique method of movement between the bundled and expanded conditions.

A basic feature of this invention is the capability of structuring the framework in many different forms by the expedient of allowing elongation of the framework in height, length and width, individually or collectively as may be desired.

In accord with the foregoing feature of the invention, two basic forms of module means are involved in this invention, "flat" module means and "transition" module means. By arranging these module means in different patterns relative to each other the aforesaid many different forms of the framework structure are made possible. By "flat" module means as used herein is meant an arrangement in which the side faces and the end faces are of rectangular form in which planes passing through the side faces are parallel and planes passing through the end faces are parallel, with the two sets of planes being perpendicular to each other. By "transition" module means as used herein is meant an arrangement in which the side faces are of trapezoidal form and the end faces are of rectangular form in which planes passing through the side faces are parallel but the planes passing through the end faces are not parallel and, preferably, are perpendicular to each other. It is preferred that all circumscribing struts of transition and flat modules are of the same length, in which case the inner and outer faces of the flat modules are of equal size and are square whereas the inner and outer faces of the transition modules are both rectangular and of the same width but with the inner face being shorter than the outer face. It is also preferred that the circumscribing sides of all modules are formed by crossed, pivotally connected or scissored struts.

The frameworks of this invention may be of a form such that when expanded, the four sides of a top central, horizontally disposed and rectangular region are defined by downwardly arching transition modules. Further transition modules may be employed to join lower corners of adjacent transition modules at each corner of the top central region to define triangular modules thereat, thus completely enclosing the top central region by the downwardly arching transition modules and the triangular modules arching downwardly at the corners of the top central region. In this way, the fully enclosed top central region offers an extremely rigid truss-like structure. Strings or series of modules forming arch portions of the framework, in which each string includes a side-bounding transition module, are completed by at least one flat module joined in end-to-end connection with an associated transition module. These strings of modules form supporting legs for the framework. Regardless of the exact configurations of these arch portions or of the number of strings or series employed, they must either be separate from each other from the base of the framework upwardly to the corners of the top central regions or be capable of such separation.

The arch portions formed by the series or strings of modules are separate or are split from each other from the base of the framework to the corners of the top central region thereof and the framework is usually sufficiently light in weight to allow it to be picked up off the ground by persons grasping the separate or separated arch portions and then "walking" the framework either to expanded or to collapsed condition, or, if the framework is very large and therefore heavy, the same procedure may be done be mechanical means. Regardless of whether the operation is commenced from the bundled condition or frome the expanded condition, the arches are moved outwardly to positions in which the feet of the arch portions are disposed outwardly beyond their normal positions of support for the expanded framework. If the framework was expanded before the operation began, the entire framework (i.e., all the modules thereof) begin to collapse in generally uniform fashion as the arch portions are moved outwardly. When the requisite outward positions are reached, their attainment will be apparent because the entire framework will commence to exert inward pulling forces on the arch portions and it remains then to move the arches inwardly while the framework substantially uniformly continues to collapse and further diminish the arch-like nature of the framework. During this procedure, the arch-like nature of the expanded framework continues to diminish and it may then be placed on the ground surface, if smooth and of low friction, whereupon the separate arch portions are further pushed inwardly until the bundled condition is reached. Manipulation from the bundled to the expanded condition is essentially the reverse of the above. As the arch portions are moved outwardly, the framework expands substantially uniformly throughout as the arching thereof progresses.

When the maximum outward positions are reached, manipulation of the framework is necessary to compel further arching of the framework as the modules move inwardly until the fully arched or expanded condition of the framwork is reached.

Dependent upon the particular configuration of framework employed and the particular configuration of modules employed, certain locking functions may be required when the framework has been expanded and, of course, when such a framework is to be collapsed, unlocking is first required.

The framework is covered with attached flexible material to complete the shelter function of the invention and when the framework has been expanded to its functionally operative condition, the flexible material is held taut by the framework. The covering material may function as a means for limiting the expansions of the modules and for lending stability to the structure, thus participating as a portion of the framework structure as a whole rather than merely as a covering. Generally stated, the covering material must be so related to the structure that it does not interfere with the expanding and collapsing functions, i.e., it may be necessary to separate or split the material as by zippers or the like to allow expansion and collapsing.

In order to provide a framework which has maximum strength, it is preferred that each of the framework is circumscribed by pairs of crossed, pivotally connected struts.

In one aspect, this invention relates to a portable shelter framework comprised of a plurality of expanded, three dimensional modules distributed throughout the framework, each module including crossed pairs of elongate struts and pivot means pivotally joining said struts for allowing said modules to be manipulated between expanded, three dimensional form and strut-bundled form. The framework includes the combination of a plurality of series of end-interconnected modules each defining an arch portion of the framework, the modules of each arch being bounded on opposite sides of the arch by crossed, pivotally connected pairs of struts and each portion including at least one transition module which when expanded defines rectilinearly bounded inner and outer face portions of the arch in which the area of the inner face portion is less than that of said outer face portion.

In one aspect of this invention, there is provided the combination of a series of end-interconnected modules defining an arch portion of a portable shelter assembly framework. The framework is formed of elongate struts and is capable of being expanded into arched three dimensional form and collapsed into boundled form in which struts are disposed in closely spaced, generally parallel relation. In the framework, the modules comprising the series of modules include at least one first module which when expanded defines inner and outer face portions of the arch portion which they define which are of the same rectangular shape and at least one second module which when expanded defines inner and outer rectangular face portions of the arch portion which are of shapes different from each other.

One module of the series is vertically disposed to present a supporting lowermost end thereof located in a definite supporting position relative to the fully expanded and arched framework and the modules including crossed, pivotally connected struts and hub means pivotally joining ends of the pairs of struts for allowing collapse and expansion of the assembly by manipulating the one module of the series of modules outwardly beyond the supporting position thereof.

The present invention concerns three dimensional frameworks for portable shelters which involve pairs of crossed, pivotally connected struts and hub means pivotally connecting the struts of adjacent pairs of struts in orthogonally patterned end-to-end relation to define modules so that the framework is movable between a collapsed, bundled condition in which the struts are disposed in generally parallel relation and an expanded condition in which the modules and framework are of three dimensional form. The modules are so arranged that a horizontally disposed top central region of the framework is at least partially bounded by transition modules extending in different directions therefrom and which effect a transition angularly from the horizontal disposition of the top region to vertically disposed modules of the assembly, i.e., through an angle of 90°. These modules are disposed in a series or string of arch form in which adjacent modules share common end-defining pairs of crossed, pivotally connected struts. By this construction, the framework may be manipulated between the collapsed condition and the expanded condition by flattening the module strings or arches so that their free ends are positioned beyond those positions which they occupy in the expanded condition of the framework, whereupon the framework may either be manipulated into the expanded condition or into the collapsed condition, dependent upon whether the framework is to be collapsed or expanded.

There may be one or more transition modules employed to effect the full 90° transition.

In a preferred form of the invention, the bounding sides of all of the modules are formed by pairs of crossed, pivotally connected struts in which all of the struts are of the same length. In this preferred form, two forms of modules are used, those in which the bounding sides faces enclose a rectangular volume and those in which planes passing through opposite side faces are parallel but where such side faces are of trapezoidal form and the opposite end faces of which are of rectangular form in which planes passing therethrough include an angle which is either 90° . or an integral division thereof if more than one such module is used in a string thereof.

In one form, this invention relates to a portable shelter having a framework which is characterized by being movable in a coordinated fashion between an expanded condition and a collapsed, bundled condition. Crossed, pivotally connected pairs of struts and hub means pivotally joining said pairs of struts in orthogonally patterned end-to-end relation define modules which are movable between a collapsed condition in which the struts are in bundled, generally parallel relation and an expanded condition in which the modules are of three dimensional form. The expanded framework defines a top central portion and a plurality of separate or separable arch portions extending therefrom downwardly in archwise fashion to terminate in supporting leg modules disposed in supporting leg positions in peripherally spaced relation around the base of the framework. Each arch portion comprises at least one string of modules sharing common ends and corresponding hub means with the arches being disposed such that planes passing through the respective opposite sides of the modules of each arch portion intersect planes passing through the opposite sides of the modules of the respective other arch portions. The framework is movable between its expanded and collapsed conditions by moving the supporting leg modules outwardly beyond their supporting leg positions and then back to or through their supporting leg positions. More particularly, in moving the framework from collapsed condition to the expanded condition, the supporting leg modules are moved outwardly from the bundled relation to beyond their supporting leg positions and then back into their supporting leg positions, whereas when moving the framework from expanded to collapsed condition, the supporting leg modules are moved outwardly beyond their supporting leg positions and then back to and past their supporting leg positions into their bundled positions.

[Because of the separate arch portions described above, the sequence involved both in collapsing and expanding is wholly different from that which is involved in my prior patents. In my prior patents, the framework is constructed so that its base expands to a maximum dimension. Thus, in order to allow expansion and collapse, there must be at least one girthwise zone of sliding or limited sliding connections at strut pair crossing points in the structure. Thus in my '808 patent, one zone of sliding at strut pair crossings is disclosed whereas in my '313 patent, alternate zones of providing and sliding are disclosed. As noted, according to this invention, no sliding zone or zones are required at all and all crossing points of strut pairs may pivoted without interfering with the collapsing or expanding of the structure. This allows a maximum of strength for the structure when it is expanded.]

In order to collapse or to expand, structures, of the present invention are provided with base-to-top region separations between those arch portions which extend in different directions from the top central region. In this fashion, when collapsing the structures the "legs" of the structure defined by these arch portions are moved outwardly (i.e., the base of the structure is further expanded) to commence the substantially simultaneous collapse of all of the modules, until a maximum expansion of the base has occurred and the "legs" then begin to retreat radially inwardly toward each other until, finally, all of the struts of the assembly have assumed a generally parallel, bundled relation with respect to each other. For expanding the structure, the reverse sequence is followed. In either case, the movements of the legs reaches a maximum beyond the normal expanded positions thereof and, at this point, the entire structure is ready to be manipulated either to expanded or collapsed condition. The girthwise sequence of modules which form the lower parts of the "legs" are perpendicular to the supporting surface for the assembly and are very stable.

Suitable means is employed to hold the framework in expanded condition. This means may be effected by forming modules to be [self-supporting] *self-locking* in the manner disclosed in any of my prior U.S. Pat. Nos. [3,698,808] *3,968,808* 4,026,313; 4,290,244; and 4,437,275, all of which are incorporated herein by reference. Alternatively, locking link means such as disclosed in the Derus Reissue patent Re. [31,164] *31,641* may be employed, with or without the face links also employed in that patent, the subject matter of which is also incorporated herein by reference. Other and different means for holding the framework in expanded condition may also be employed as for example, split hub locking as is disclosed in my prior U.S. Pat. No. 4,473,986, the subject matter of which is incorporated herein by reference. Another form of locking which may be used is that as described in the Alphonse et al U.S. Pat. No. 4,479,340, the subject matter of which is also incorporated herein by reference. The hub means preferred in this invention are those of the ring and blade type as disclosed in my prior U.S. Pat. No. [4,280,251] *4,280,521* which is also incorporated herein by reference.

A preferred embodiment of this invention is characterized in that each module of the assembly is self-contained in the sense that each is [self-supporting] *self-locking in the expanded or erected condition of the assembly. By* [self-supporting] *self-locking* is means that each module when expanded attains a "locked" configuration by virtue of the asymmetrical geometry of that module. The necessary and sufficient condition for [self-supporting] *self-locking of each module is that for each pair of inner and outer hubs around the periphery of the module, the sum of the distances from an inner hub along a strut exceeding thereform, to the pivoted crossing point with a strut extending from the corresponding outer hub is the same, but that the individual components of the sum are not equal for those struts which extend from these inner and outer hubs toward the center of the module (i.e., the asymmetry condition). This inequality of individual components leads to the condition in which the plane passing through the pivoted crossing points of these centrally extending strut pairs does not lie at the neutral or non-locking position between the planes passing through the inner and outer hubs respectively. This form of module is preferred because, although it adds weight to the framework, each module is inherently stronger and more rigid than otherwise.*

Other and further objectives of this invention will be apparent as the following detailed description proceeds.

BRIEF DESCRIPTION OF THE DRAWING FIGURES

DETAILED DESCRIPTION OF THE INVENTION

Figure 1:
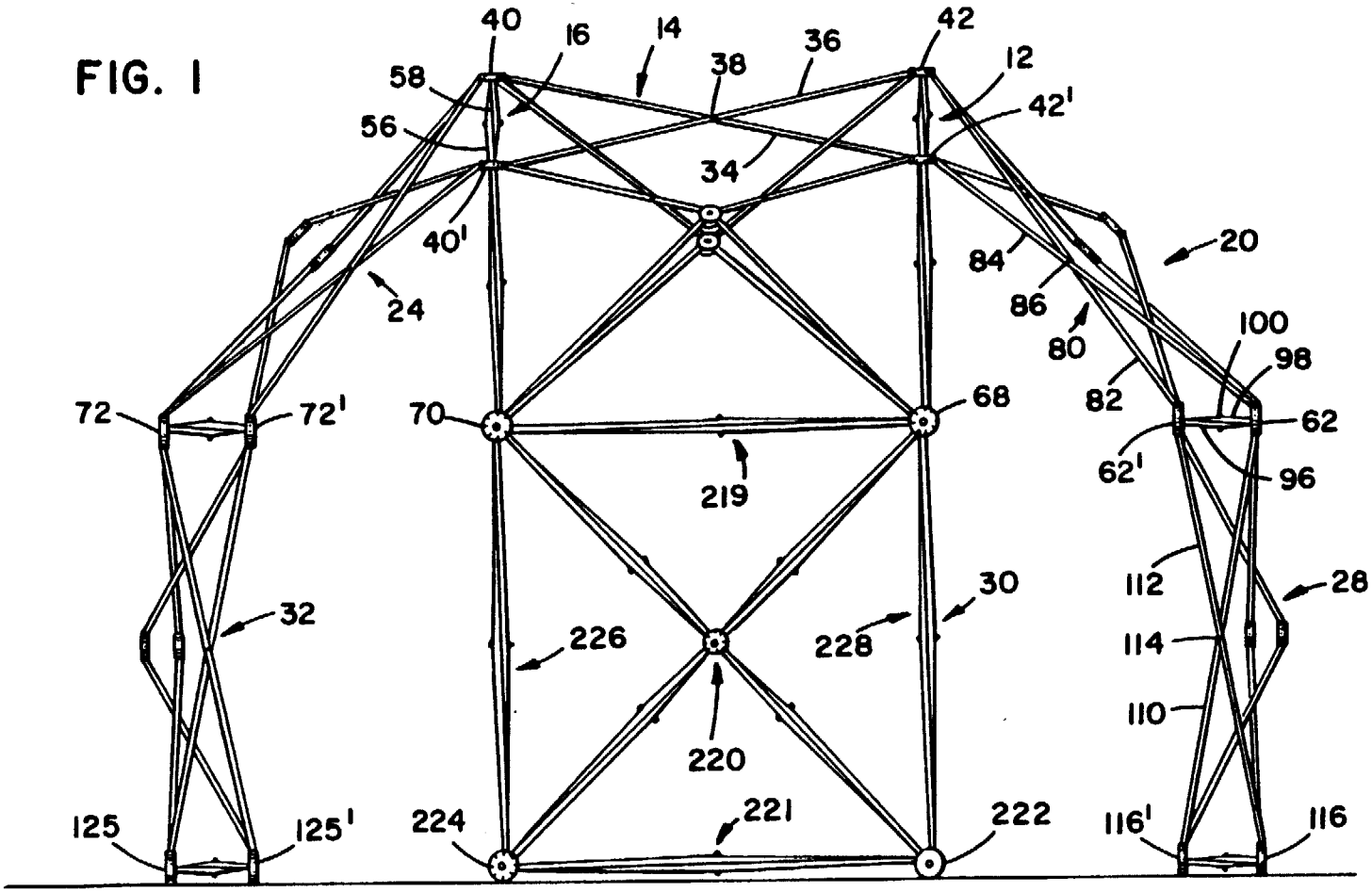
FIG. 1 is a side elevational view of a shelter framework of an embodiment of the invention.
Figure 2:
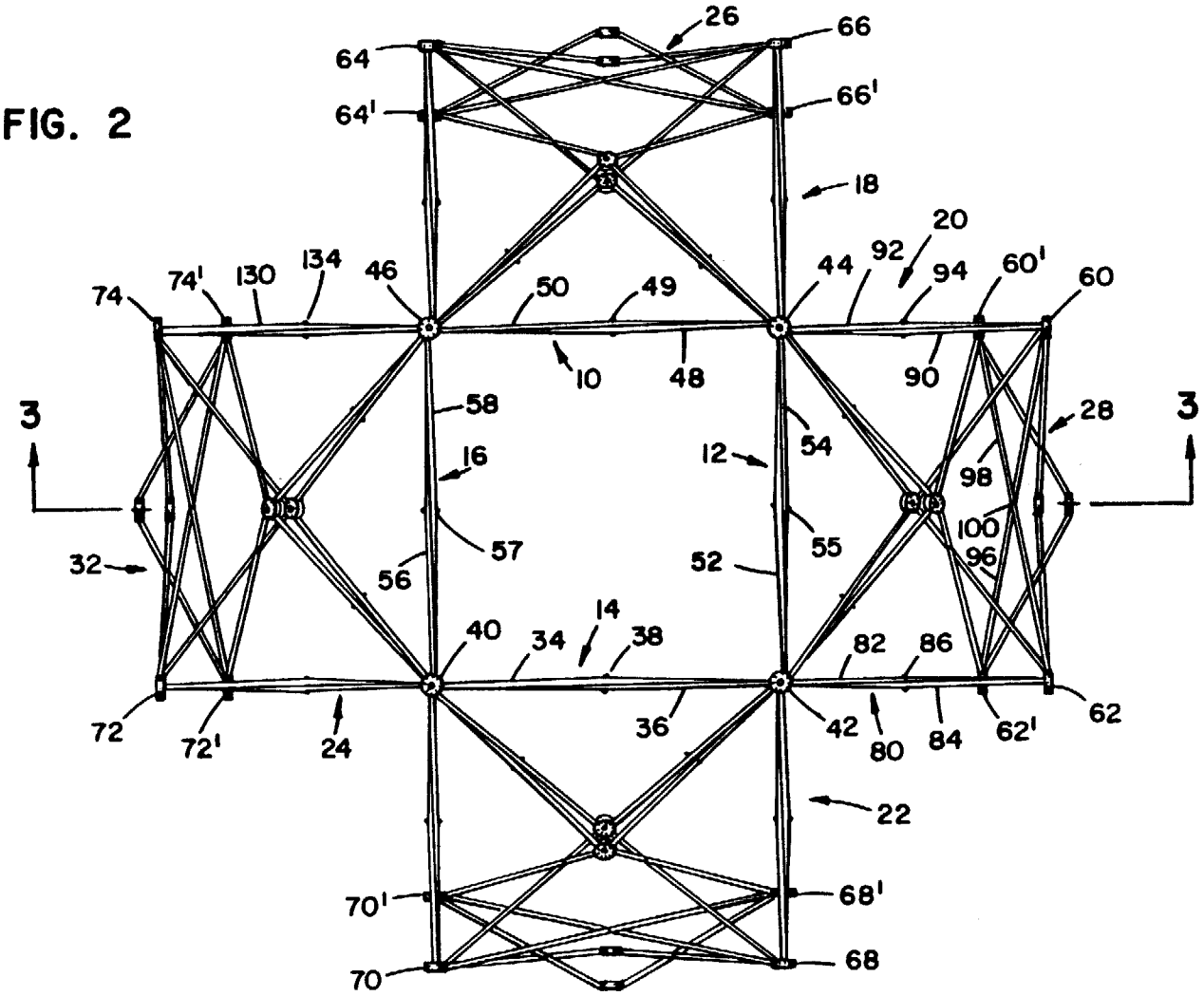
FIG. 2 is a plan view of the framework of FIG. 1.

With reference at this time to FIG. 2 wherein a top plan view of one form of the invention is illustrated the top, central portion of the expanded framework shown is seen to be of module form circumscribed by crossed, pivotally connected pairs of struts indicated generally at 10, 12, 14 and 16, in which the ends of the pairs of struts are pivotally joined by hub means later identified in detail. In this particular embodiment, these circumscribing pairs of struts are shared in common with the bounding transition modules 18, 20, 22 and 24 which, as seen better in FIG. 1, are end-connected to the vertically disposed modules 26, 28, 30 and 32. As shown in FIG. 1, the crossed pair of struts 14 defining one side of the top central region module and shared in common with the transition module 22 comprise the strut 34 and the strut 36 which are of equal lengths and are pivotally connected at their centers by the pivot pin or rivet 38. The strut 34 is pivoted at one end to the hub means 40 and at its other end to the hub means 42'. The strut 36 is pivoted at one end to the hub means 40' and at its other end to the hub means 42. It will be understood that the hub means are preferred to be of the general ring and blade form described in detail in my prior U.S. Pat. No. [4,280,251] *4,280,521* and that by equal length struts is meant that the distance between the ring holes in the blades at opposite ends of a strut is a fixed distance.

Similarly, the two stuts forming the pair 10, i.e., the struts 48 and 50, are pivotally connected at their mid-points by the pivot pin means 49 and are respectively pivotally connected to the hub means 44 and the hub means 46' underlying the hub means 46 (see FIG. 3) and the hub means 46 and the hub means 44' underlying the hub means 44. Likewise, the struts 52 and 54 forming the pair 12 are respectively pivotally connected at their ends to the hub means 42 and 44'. Lastly, the two struts 56 and 58 forming the pair 16 are pivotally connected at their mid-points by the pivot pin means 57 and are respectively pivotally connected at their ends to the hub means 40 and 46' and to the hub means 40' and 46.

For ease of identification the convention which will be used herein with respect to the various hub means is that all hub means which are on the outer side of the framework will be identified by respective reference characters whereas their corresponding inner hub means will be identified by corresponding primed reference characters. Thus, with respect to the corners of the various modules in FIGS. 1–3, the eight hub means of the transition module 20 are identified by the reference characters 42, 42'; 44,44'; 60,60'; and 62,62'. The eight hub means associated with the corners of the transition module 18 are the hub means 44,44'; 46,46'; 64,64'; and 66,66'. Likewise, the eight corners of the transition module 22 are associated with the hub means 40,40'; 42,42'; 68,68'; and 70,70'. Finally, the eight corners of the transition module 24 are associated with the hub means 40,40'; 46,46'; 72,72'; and 74,74'.

Figure 3:
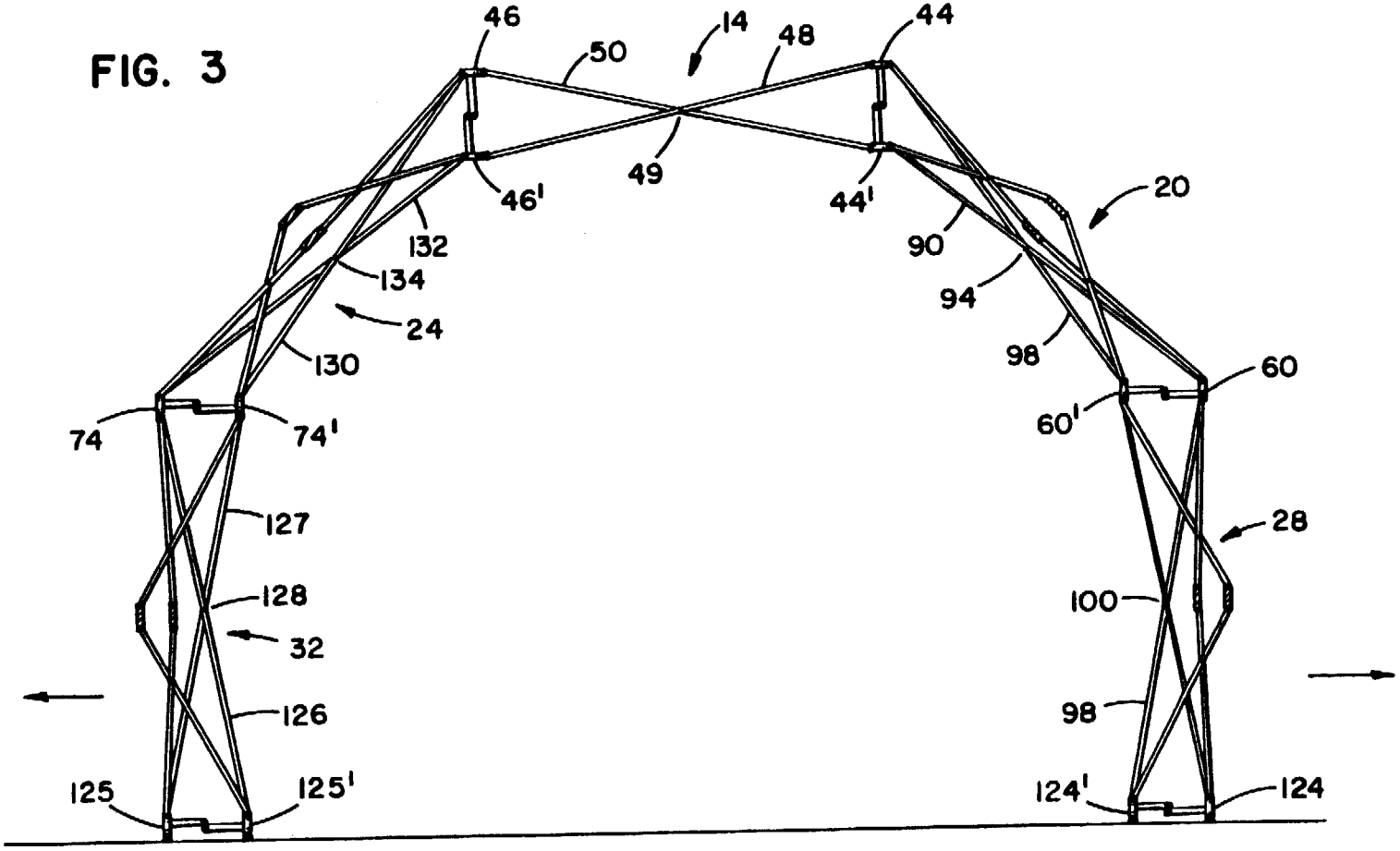
FIG. 3 is a vertical section taken along the plane of section line 3—3 in FIG. 2.

In the embodiment illustrated in FIGS. 1–3, the transition modules effect a 90° transition between the horizontally disposed top central region of the framework and their corresponding vertical modules. For this purpose, the opposite pairs of crossed, pivoted struts are asymmetrically disposed with respect of the pivot pins or rivets pivotally connecting them. This is evident in FIG. 1, for example, wherein it will be seen that for the near pair 80 of crossed struts, the equal length struts 82 and 84 are pivotally connected by the pivot pin 86 such that the length along the portion of the strut 82 from the hub means 42 to the pivot pin 86 is longer than is the distance from the pivot in 86 to the hub means 62'. As is disclosed in my prior U.S. Pat. No. 3,968,808, the necessary and sufficient condition for allowing the framework to collapse into a bundle of generally parallel struts and to be expanded to its three dimensional form is that for each corresponding pair of inner and outer hub means, the sum of the distance along one strut of a pair of crossed, pivotally connected struts from its pivotal connection with an outer hub means to the pivoted connecting point between that pair of stuts plus the distance back along the other strut of the pair from that pivoted connecting point to the pivotal connection of that other strut with its corresponding inner hub is a constant. To illustrate, the sum of the distance along the strut 82 from its pivotal connection with the hub means 42 to the pivot pin 86 plus the distance from the pivot pin 86 back along the strut 84 to its pivotal connection with the hub means 42' is a constant and is equal to the sum of the distance along the strut 36 from its pivotal connection with the hub means 42 to the pivot pin 38 plus the distance from the pivot pin 38 back along the strut 34 to its pivotal connection with the hub means 42', and so forth. It is evident that this rule requires that this sum is equal to the length of a single strut of the pairs of struts circumscribing a module so that all such circumscribing struts are of equal length. Since the modules of the framework share common strut-defined sides, it follows that a single strut length is employed for all struts which circumscribe the modules, whether the module is of the flat type or of the transition type. For the flat modules, each pair of circumscribing struts are pivoted at their mid-points and for the transition modules, the pairs of struts at opposite ends of the module are also pivoted at their mid-points but along the opposite sides of the transition modules, the struts are not pivoted at their mid-points.

Thus, in the particular embodiment illustrated in FIGS. 1–3, the lengths of all struts which form strut pairs circumscribing the various modules is the same. Thus, the module defining the top central region is of square plan view as are all the vertically oriented modules. On the other hand, all of the transition modules have opposite sides of trapezoidal shape and opposite ends which are of rectangular shape, the planes passing through the crossed struts at the opposite ends of the transition modules intersecting at an angle of 90° so as to effect the aforesaid transition from the horizontally disposed top central region to the upper ends of the vertically disposed modules. The planes passing through the opposite sides of the transition modules are parallel as are the planes passing through the opposite sides of the vertically oriented modules. Likewise, the planes passing through the opposite ends of the vertically oriented modules are parallel to each other.

Figure 8:
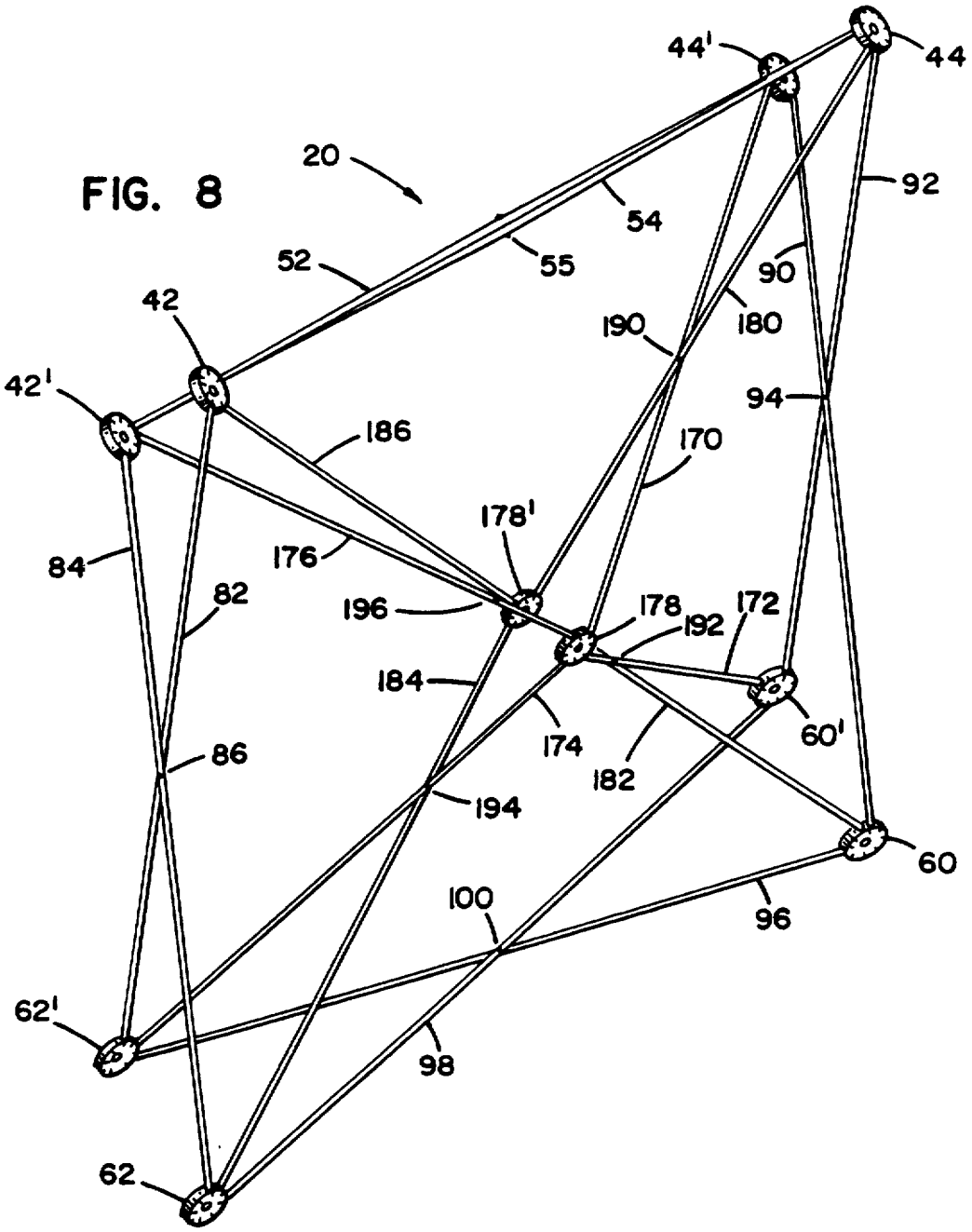
FIG. 8 is a perspective view of a transition module.
Figure 9:
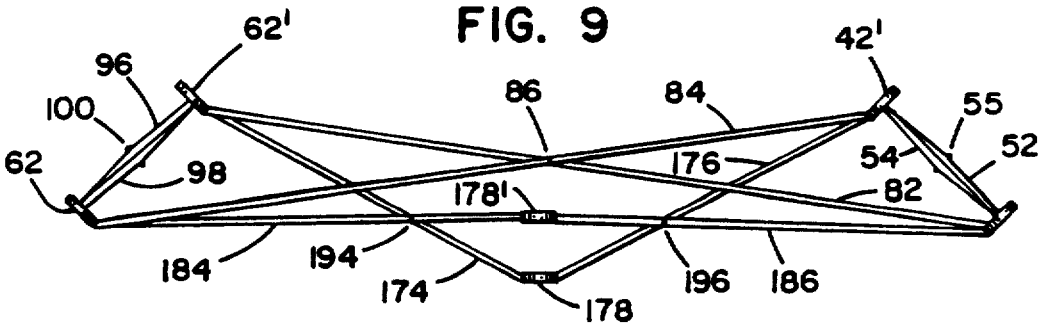
FIG. 9 is a side elevational view of the module of FIG. 8.

A single transition module 20 of this embodiment of the invention is illustrated in perspective in FIG. 8 and in elevation in FIG. 9.

Thus, the transition modules are characterized by the fact that their inner face portions are rectangular but of a shape different from the rectangular shape of their outer face portions. In the case of the vertically disposed modules, their inner and their outer face portions are the same rectangular shape and are, moreover, square.

Moreover, each string of modules such as the end-connected modules 32 and 24 forms an arch portion of the framework and each such arch extends from the top central region downwardly, in archwise fashion, from the top central region in a different direction. Thus, from the base of the framework as is defined by those ends or hubs means of the vertically disposed molecules which engage the supporting surface G, the framework is split from the base to the peak or top central region. This separation between arches which extend in different directions from the top central region allows the framework to collapse or to expand in the fashion illustrated in FIGS. 4 and 5 as is later described.

Returning now to FIGS. 1–3 to complete the description of the assembly shown therein, the struts 90 and 92 of the pair of crossed, pivotally connected struts defining the far side of the transition module 20 are asymmetrically pivoted by the pivot pin 94 in the fashion previously described for the near side struts 82 and 84. The strut 90 is pivotally associated with the hub means 60 and 44' whereas the strut 92 is pivotally associated with the hub means 44 and 60'. The remaining end side of the transition moodule 20 is defined by the crossed, pivotally connected pair of struts 96 and 98 which are centrally pivoted together by the pivot pin 100, in the same fashion that the opposite end struts 52 and 54 are centrally pivoted by the pivot pin 55. Thus, for a transition module such as 20, the opposite ends are each defined by a pair of crossed, pivotally connected struts wherein the pivot pin is located at the centers of the struts and the planes passing through such ends intersect at a right angle whereas its opposite sides are each defined by a pair of crossed, pivotally connected struts in which the pivot pin is located asymmetrically along the struts and the planes passing through these sides are parallel. On the other hand, the opposite ends as well as the opposite sides of the other modules such as the module 28 are each defined by a pair of crossed, pivotally connected struts in which the pivot pin is located centrally of the struts and the planes passing through the respective sides as well as the planes passing through the opposite ends are parallel. One such module 28 is illustrated in larger scale in FIGS. 6 and 7.

Figure 6:
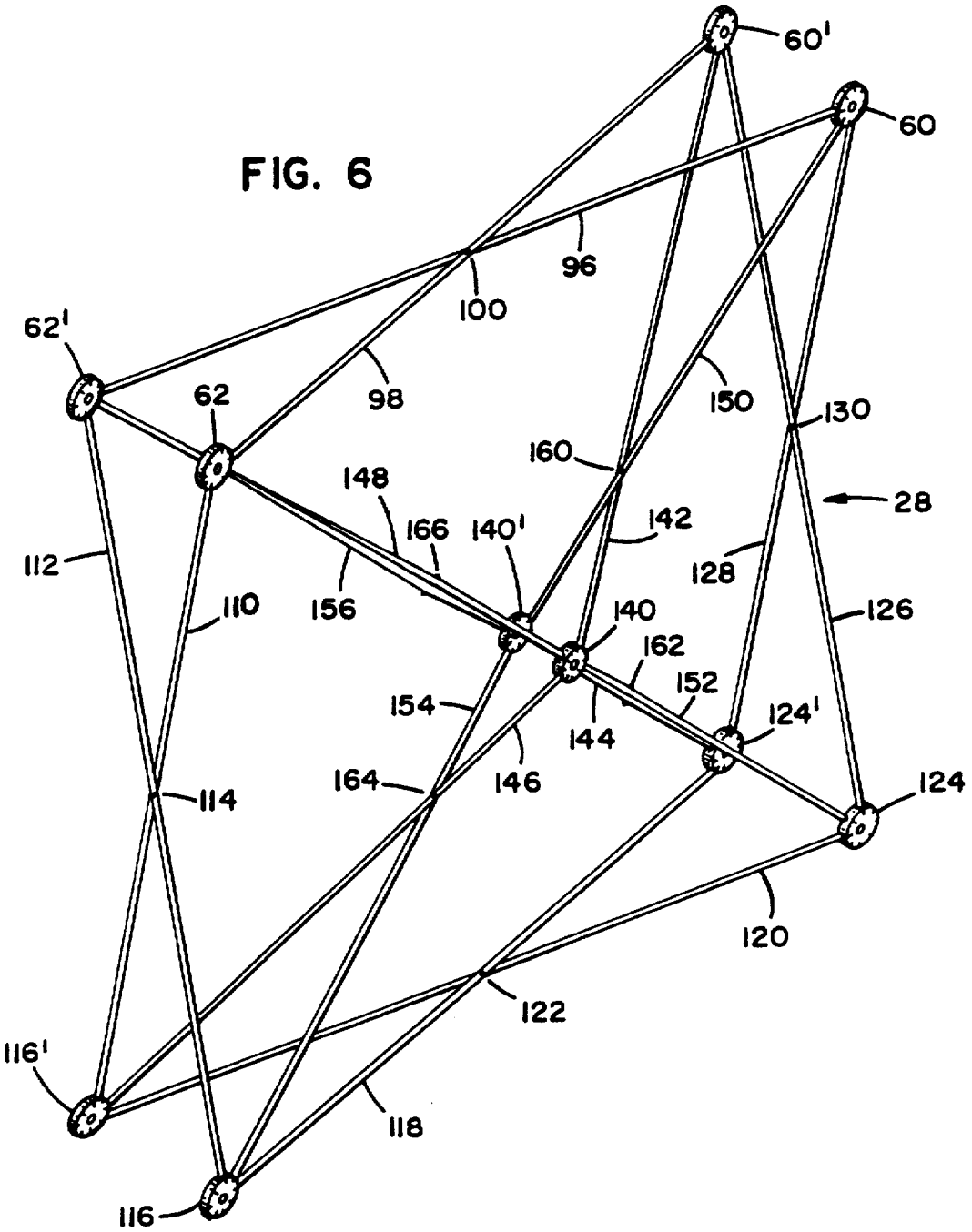
FIG. 6 is a perspective view of one of the vertically disposed modules.

As shown in FIG. 6, the two struts 96 and 98 defining one end of the transition module 20 are shared with the module 28, as are the several hub means 60,60' and 62,62'. One side of the module 28 is defined by the crossed, pivotally connected pair of struts 110 and 112 which, like the struts 96 and 98, are pivotally connected at their centers by the pivot pin 114. The strut 110 is pivotally connected at one end to the hub means 62 and at its opposite end to the hub means 116' whereas the strut 112 is pivotally connected at one end to the hub means 62' and at its other end to the hub means 116. At its bottom end, the module 28 is defined by the crossed, pivotally connected pair of struts 118 and 120 which are pivotally joined at their centers by the pivot pin 122. The strut 118 is pivotally connected at one end to the hub means 116 and at its opposite end to the hub means 124'. The strut 120 is pivotally connected at one end to the hub means 116' and at its other end to the hub means 124. Lastly, the other vertical side of the module 28 is defined by the pair of crossed, pivotally connected struts 126 and 128 whose centers are connected by the pivot pin 130. The strut 126 is pivotally connected at one end to the hub means 124 and at its opposite end to the hub means 60'. The strut 126 is pivotally connected at one end to the hub means 124 and at its opposite end to the hub means 60'. Thus, all the sides and ends of the module 28 are the same and this holds true for all other modules of this embodiment of the invention except for the transition modules.

Inasmuch as the circumscribing ends/sides of all similar modules are the same, no further description of the sides and ends of the other transition modules 18, 20, 22 and 24 or of the other modules 26, 30 and 32 and the module defined at the top central region by the circumscribing ends of the transition modules will be given. However, it should be noted that the circumscribing struts are woven in a preferred pattern around each module. This weaving is readily seen in FIG. 6. One way of stating the preferred rule is that if a strut such as 112 is placed outside its associated strut 110, then the next successive strut 96 should be placed inside its associated strut and so on. That is, the next successive strut 128 in the sequence of struts 112, 96, 128 and 118 would be outside its associated strut 126 and, lastly, the strut 118 would be inside its associated strut 120. This weaving pattern distributes the bending actions on the struts evenly while assuring that the inner and outer hub means are in spaced registry with each other when the framework is expanded.

Although the means for holding the framework in the expanded condition has not as yet been described for FIGS. 1–3, it is well at this point to describe the cooperation among the components during manipulation of the framework between collapsed and expanded conditions. For this purpose, a simplified form of framework is illustrated in FIGS. 4 and 5, to which reference is now had.

From these FIGS. it will be seen that the simplified form of the framework is identical with that described in connection with FIGS. 1–3 except that the self-locking central struts for each module (which are to be described later) are not employed. Thus, the flat modules 14, 28 and 32 are readily seen as well as the transition modules 20 and 24. The various hub means and struts described above in FIGS. 1–3 are also illustrated and additional hub means 125 and 125' as well as struts 126 and 127 of the module 32 and the pivot pin means 128 which pivotally connects them at their mid-points and struts 130 and 132 of the module 24 and the pivot pin means 134 which pivotally connects them in offset relation to their mid-points. FIG. 4 illustrates approximately the maximum position of the framework in making the transition either to [e] *the* expanded condition or to the collapsed condition. The arch portions defined by the modules 28 and 20 and by the modules 24 and 32 are flattened in comparison with their positions in FIGS. 1–3. Furthermore, all of the modules throughout the framework are in partially collapsed condition. Thus, the depth of each module is greater than its depth in the fully expanded condition, as will be readily [evicent] *evident* from comparison between FIGS. 3 and 4. The position of FIG. 4 is attained by moving all of the arch portions outwardly [aw] *as* previously described. Thus, with reference to FIG. 2, the arch portion defined by the modules 20 and 28 and the arch portion defined by the module 24 and the module 32 are moved away from each other whereas the arch portion defined by the module 18 and the module 26 and the arch portion defined by the module 22 and the module 30 are moved away from each other. This should be done in as uniform and simultaneous fashion as is reasonably possible. When it is done manually, as is feasible when the weight of the framework and its covering is such that no difficulty is had for four persons to lift the entire assembly off the supporting surface, one person is positioned at each of the four arch portions and the respective four modules 28, 30, 32 and 26 are grasped and the assembly lifted. Then the persons involved move their respective modules as aforesaid until the position of FIG. 4 is reached. At this time, all of the modules of the framework are partially collapsed and they will tend to collapse further under the weight of the framework, exerting inward pulling forces which are readily perceived by the persons holding the framework. If, as described at this time, the framework is being moved from expanded condition to collapsed condition, the persons involved merely respond to the inward pulling forces and move their modules inwardly as is indicated in FIG. 5. Finally, the modules are pushed inwardly until the bundled, collapsed condition is reached.

Figure 4:
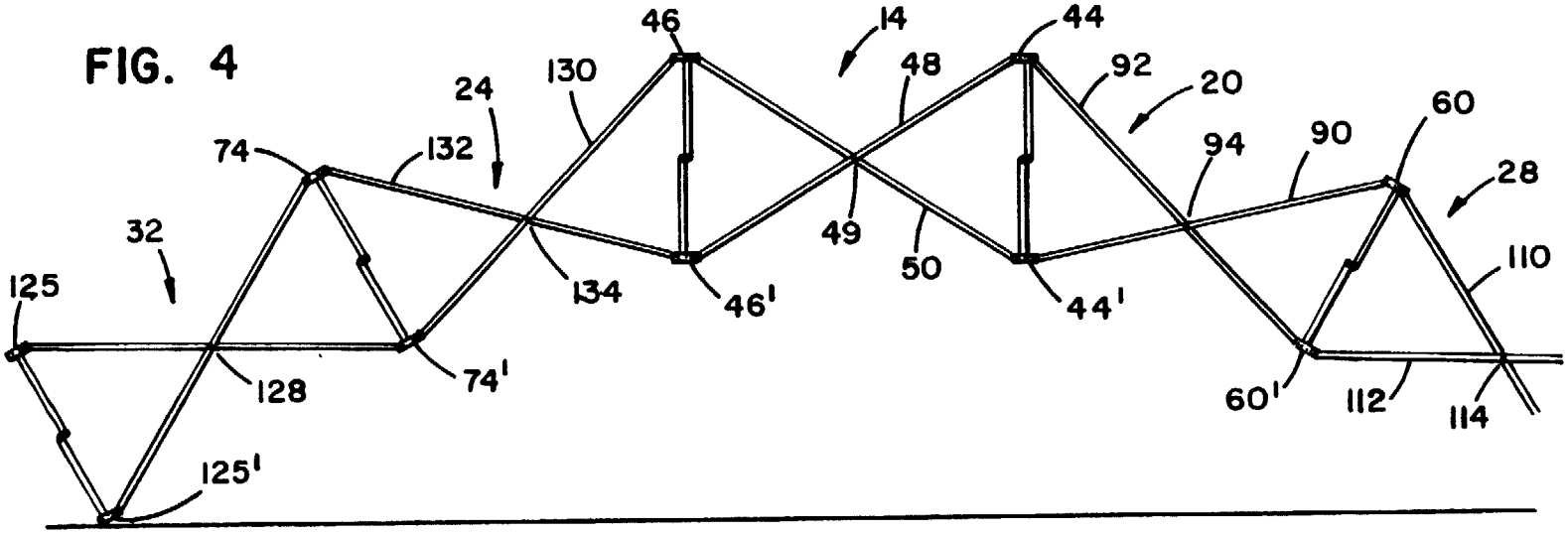
FIG. 4 is a schematic view similar to FIG. 3 but showing a simplified form of framework in its maximum base dimension condition.
Figure 5:
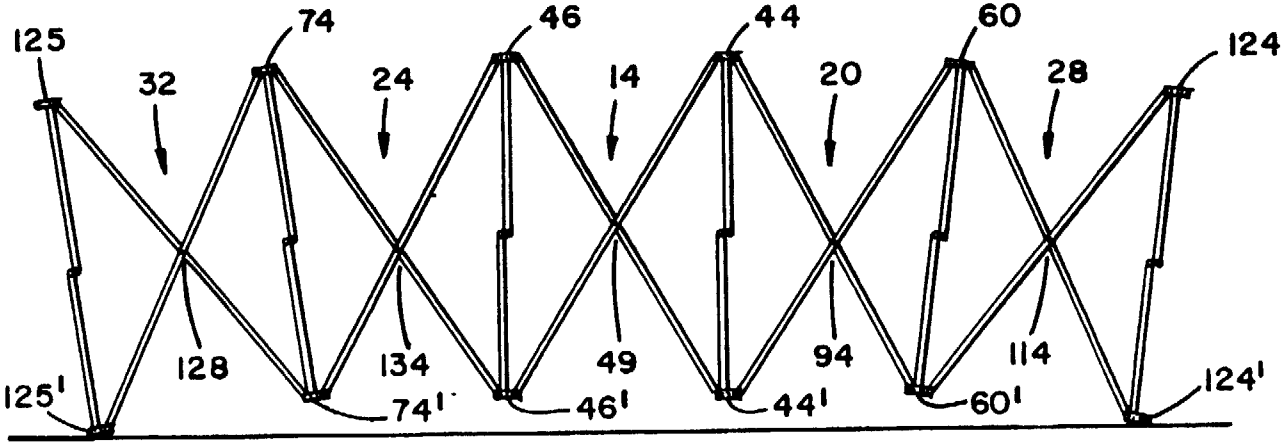
FIG. 5 is a schematic view similar to FIG. 4 but showing a retreating position of the framework.

Starting from the collapsed condition, the four persons involved again grasp their respective modules 28, 30, 32 and 26 and after lifting the framework assembly, they move their respective modules outwardly until the FIG. 4 position is reached. Now, in order to manipulate the framework assembly to the expanded condition, it is necessary not only to move the grasped modules inwardly, but also to urge the framework assembly simultaneously toward the expanded condition. This may be done in any way which is convenient. Perhaps the easiest way is for four persons each to manipulate the module they are holding towards its expanded condition as such module is being moved inwardly. Other and different techniques may of course be used as, for example, a fifth person could push upwardly on the framework from the interior, etc.

The particular technique employed may depend in large part upon the type of framework involved. For example, if the framework assembly is of the self-locking module type illustrated in FIGS. 1-3, the transition toward the expanded condition from the FIG. 4 condition is more difficult than is the case for the modified form of the framework, without the self-locking modules, of FIGS. 4 and 5. In fact, for the framework type as in FIGS. 4 and 5, very little effort is required to urge the assembly toward the expanded condition as the modules are moved inwardly from the FIG. 4 position.

Once the framework assembly has been moved to the expanded condition, it will self-lock in the expanded condition if the modules, or some of the modules are of the self-locking type. If no self-locking of the framework modules is employed, extraneous locking is normally desirable. However, it should be noted that the flexible covering material as disclosed in my prior patents will aid in holding the framework assembly is expanded condition. That is, in moving the FIG. 4 condition to the expanded condition, the covering material will become taut as the modules reach a maximum of expansion, and it will thus limit the expanded condition of each module. In some cases, this is sufficient to reatain the framework assembly in the expanded condition, bearing in mind also that with the modules 28, 30, 32 and 26 resting in contact with the supporting surface, a substantial degree of stability is derived therefrom.

However, it is also to be noted that extraneous locking means may also be employed as may be necessary and that such extraneous locking means may take any desired form such as is described in my prior U.S. Pat. No. 4,473,986; the Derus U.S. Pat. No. Re. 31,641; the Alphonse et al U.S. Pat. No. 4,479,340 or the like. In fact, any extraneous locking, holding or anchoring means may be employed, as is desired.

For maximum rigidity and strength, however, the preferred configuration resides in the provision of self-locking module configurations and these are easily implemented in accord with the teachings of my prior patents. Thus, referring to FIGS. 6 and 7, each flat module means may employ the central strut structure therein and which will now be described.

Figure 7:
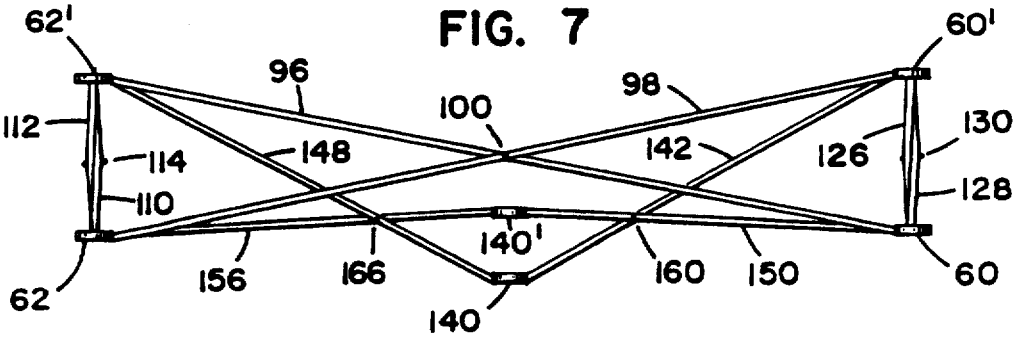
FIG. 7 is a top plan of the module of FIG. 6.

Although FIGS. 6 and 7 illustrate the particular flat module 28, it will be understood that any and all flat modules within the framework may take this form. As illustrated, the outer and inner hub means 140 and 140' are provided. The blades at the inner ends of the struts 142, 144, 146 and 148 are pivotally connected with the ring of the hub means 140 (see my prior U.S. Pat. No. 4,280,521) whereas the blades at the inner ends of the struts 150, 152, 154 and 156 are pivotally connected with the ring of the hub means 140'. Likewise, the blades at the outer ends of the struts 142, 144, 146 and 148 are connected pivotally with the rings of the respective hub means 60', 124', 116' and 62'. The set of struts 142, 144, 146 and 148 are of the same length but are longer than the struts of the set 150, 152, 154 and 156. It will be noted that pairs of struts of the two sets are in crossed, pivoted relation, i.e., they constitute scissored pairs of struts. Thus, the pair of struts 142 and 150 is pivotally connected by the pivot means 160; the pair of struts 144 and 152 is pivotally connected by the pivot means 162; the pair of struts 146 and 154 is pivotally connected by the pivot means 164; and the pair of struts 148 and 156 is pivotally connected by the pivot means 166. The lengths of the struts of the two sets are chosen so that two conditions are met. First, the previously described necessary and sufficient condition for movement between the collapsed condition and expanded condition must be followed. That is, for each pair of inner and outer hub means such as the hubs 62 and 62', the distance along the strut 156 from its pivotal connection with the hub means 62 to the pivot point at 166 plus the distance along the strut 148 from the pivot point at 166 back to its pivotal connection with the hub means 62' is the previously described constant which is equal to the length of a circumscribing strut between its end pivotal points. Second, the necessary and sufficient condition for self-locking must be followed. This necessary and sufficient condition is that a plane passing through the pivot means 160, 162, 164 and 166 must be offset from the plane passing through the pivot means 100, 130, 122 and 144. This is evident from FIG. 7. If these two planes are coincidental, i.e., are one and the same plane, a "neutral" condition prevails and no self-locking action is attained. On the other hand, the more the plane passing through the pivot means 160, 162, 164 and 166 is offset from the plane passing through the pivot means 100, 130, 122 and 114 toward the ultimate position in which such plane also passes through the set of hub means such as the hub means 60, 62, 116 and 124, the stronger the self-locking action becomes. Because the forces of self-locking generated become larger as the ultimate position is approached, it is preferred to soften the self-locking action to some degree by choosing the lengths of the struts of the two sets such that the struts 150, 152, 154 and 156 each lie at a small angle (in the order of 3°-7°) to the plane passing through the hub means 60, 62, 124 and 116.

With reference to FIGS. 8 and 9, the same general principles for self-locking as described above for FIGS. 6 and 7 prevails. The central struts in this case are the set of struts 170, 172, 174 and 176 and the set of struts 180, 182, 184 and 186. The central outer and inner hub means are 178 and 178'. The scissored crossing point are at the pivot means 190, 192, 194 and 196. As noted before, the length of each circumscribing strut such as the strut 52 is of the same length as that of all the other circumscribing struts of all other modules, i.e., the length of the strut 52 in FIGS. 8 and 9 is the same as the length of the strut 98 in FIGS. 6 and 7. Similarly, it is the case that the length of each strut such as the strut 154 in FIGS. 6 and 7 is the same as the length of each strut such as the strut strut 184 of FIGS. 8 and 9. Likewise, the length of each strut such as the strut 146 of FIGS. 6 and 7 is the same as the length of each strut such as the strut 174 of FIGS. 8 and 9. Thus, only three different length struts need be used throughout the entire framework assembly, thus greatly simplifying fabrication. [FIGS. 10 and 11 illustrate *FIG. 10 illustrates* how different patterns of modules may be employed to achieve an infinite variety of framework configurations with indepence among height, width and length.

Figure 10:
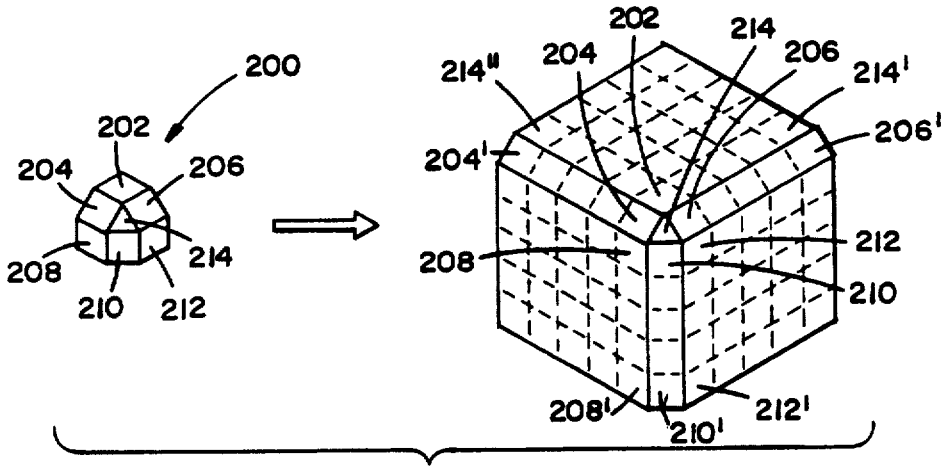
FIG. 10 is a schematic sequence illustrating a basic rhombicuboctahedron and one sequence of changing the pattern of modules to achieve different forms of frameworks.
Figure 11:
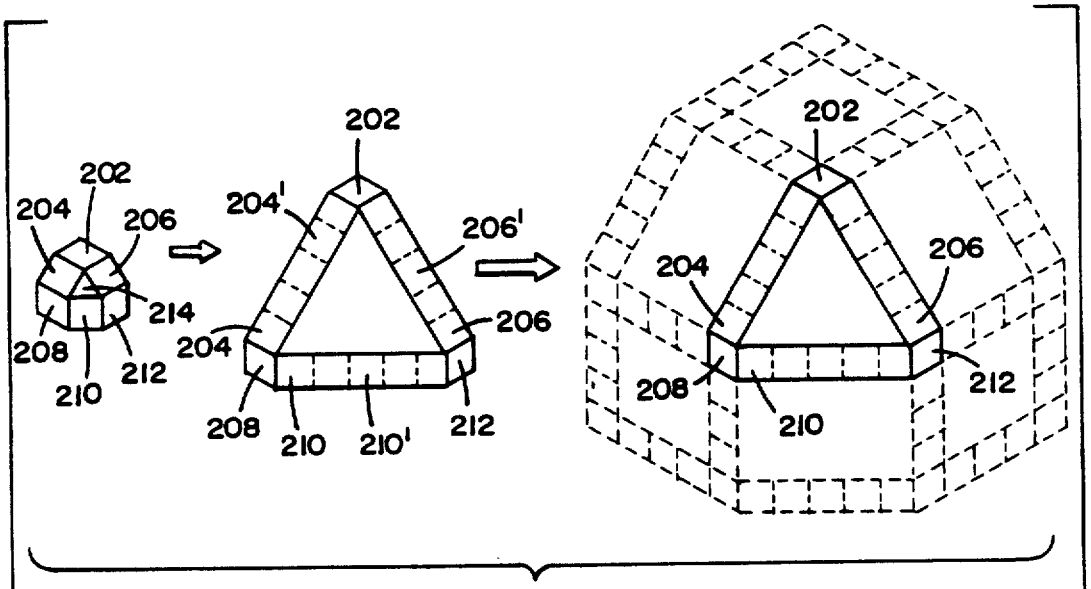
[FIG. 11 is a schematic sequence similar to FIG. 10 but illustrating other pattern changes.]

In FIG. 10, a basic rhombicuboctahedron is indicated at 200. From the perspective angle of the Figure, only seven faces of the rhombicuboctahedron are seen. However, there are in reality twenty six faces to this body. What is illustrated are the faces which will be termed herein as the top central face 202, the two transition faces 204 and 206, the girthwise faces 208, 210 and 212, and the triangular (equilateral) face 214. Girthwise of the rhombicuboctahedron, there are five more faces in addition to the three faces 208, 210 and 212 illustrated; in the transition region there are two more transition faces in addition to the transition faces 204 and 206 illustrated and three more triangular faces in addition to the triangular face 214 illustrated. The four transition faces plus the four triangular faces and the top central face constitute the top pyramid of the body. On the bottom pyramid which is not seen, there is a bottom central face corresponding to the face 202 and all of the faces corresponding with the top pyramid transition faces and the top pyramid triangular faces, a total of twenty six faces in all, eight girthwise faces, two central region faces, eight transition faces and eight triangular faces. From the form of the invention illustrated in FIGS. 1-3, it will be seen that the expanded module 30 defines the girthwise face 208, the expanded module 28 defines the girthwise face 212, the expanded module 14 defines the top central face 202, the expanded module 22 defines the transition face 204 and the expanded module 20 defines the transition face 206. Further, it will be seen that the expanded module 32 defines the girthwise face opposite the girthwise face 212, the expanded module 26 defines the girthwise face opposite the girthwise face 208, the expanded module 24 defines the transition face opposite the transition face 206 and the expanded module 18 defines the transition face opposite the transition face 204.

It will also be evident from FIGS. 1-3 that all of four of the girthwise faces corresponding to the girthwise face 210 in FIG. 10 are left open as entrances for the shelter assembly. Similarly, none of the four triangular transition faces corresponding with the triangular transition face 214 of FIG. 10 is defined by any modules in FIGS. 1-3. In addition, the entire bottom pyramid is not used.

At this time, however, it should be noted that other and different configurations than is illustrated in FIGS. 1-3 may be employed for the basic rhombicuboctahedron. Before discussing these possibilities in detail, it should be pointed out that whereas the basic rhombicuboctahedron is a regular solid having eighteen square faces and eight triangular faces, the frameworks of this invention involve modules which define only four girthwise square faces and no transition faces which are either square or of equilateral form. To illustrate, the four modules 26, 28, 30 and 32 all define when expanded four square girthwise faces. However, if the framework also includes a module which corresponds, say, with the girthwise face 210 of FIG. 10 such module will be a transition module such as that illustrated in FIGS. 8 and 9 (i.e., a module such as 20) but which has been rotated 90° as expanded in more detail hereinafter. Thus, such a girthwise transition module will define a rectangular girthwise face rather than a square girthwise face as illustrated at 210 in FIG. 10.

The use of such a further girthwise module is indeed desirable because it not only defines a girthwise face which is at an angle to any [falt] *flat* module adjacent to it and which defines another girthwise face, but it also cooperates with other modules in the framework assembly to complete the triangular face at the corresponding corner of the top central face or region. This lends greater rigidity to the framework when expanded. Indeed, when all four girthwise faces such as 210 are employed, an extremely rigid structure is formed because the top central region is bounded and circumscribed completely by transition modules so that in any vertical section, a deep truss-like structure is present.

Thus, one possibility of modifying the basic rhombicuboctahedron from the form illustrated in FIGS. 1-3 is to omit, say, the two girthwise modules 26 and 30 and add four girthwise transition modules. Such a configuration, referring to FIG. 1 at this time, would omit all of the central or self-locking struts 220 as well as the scissored pairs of struts 221, 226 and 228 and the hub means 222 and 224 as well as their corresponding inner hub means as indicated in FIG. 1 but would retain the two pairs of hub means 68, 68' and 70, 70' as well as the scissored pair of struts 219. A transition module such as the module illustrated in FIGS. 8 and 9 could be added as follows. The two hub means 44 and 44' of FIG. 8 would lie adjacent the positions of the hub means 68,68'of FIG. 1 with the pair of scissored struts 52 and 54 of FIG. 8 extending vertically and the hub means 42 and 42' of FIG. 8 lying adjacent the positions of the removed hub means 222 and its corresponding inner hub means of FIG. 1 with the two struts 82 and 84 of FIG. 8 extending to the hub means 116 and 116' (i.e., the hub means 62,62' of FIG. 8 become the hub means 116,116' of FIG. 1) and the hub means 60,60' of FIG. 8 become the hub means 62,62' of FIG. 1 and the two struts 96 and 98 of FIG. 8 becoming the struts 110 and 112 of FIG. 1.

Of course, the three remaining transition modules to be added would be similarly arranged in the pattern of modules. It is to be noted that a transition triangular face would be defined at each corner of the top central module or region 14 to provide the complete bounding or circumscribing of this top central region to provide the truss-like relationship previously described. Although not essential, the added transition modules may be manually joined to a corner of an adjacent transition module for increased rigidity. That is, with relation to the added transition module described above, the hub means 44,44' of FIG. 8 may be manually joined to the hub means 68,68' of FIG. 1. Since the framework must be separate or separable from the base of the framework upwardly to the top central region, and especially to the corners of the top central region, if manual joining of the hub means is employed, such joining must be removed before the framework is collapsed.

Such joining is especially important in lending rigidity to the framework if the modules are not of the self-locking type and omit the central struts, employing only the circumscribing pairs of struts. With such a configuration, with four added transition modules as above, the manual joining in and of itself is sufficient not only to lock the framework in expanded condition but also lends such increased rigidity thereto as does not require any further locking, especially since the fabric itself leads stability to the structure.

It will be apparent that additional configurations may be made as, for example, by omitting only one of the girthwise modules in FIG. 1.

Returning to FIG. 10, on the right-hand side thereof as indicated by the arrow, an infinite variation of the module patterns may be made. The seven faces illustrated at the left-hand side of FIG. 10 are identified in the right-based side as well and it will be seen that addition of transition modules may be made in any one or a combination of orthogonal directions from the triangular face 214. Thus, one or more transition modules 204', 206' or 210' may be added independently to increase the length, width or height of the shelter structure. Obviously, when a transition module 206' is added, the area of the top central region is correspondingly increased as noted by the additions 214'. Similarly, as transition modules 204' are added, the area of the top central region is increased as noted by the additions 214". As transition modules 210 are added, as noted by the module 210', corresponding girthwise modules 208' and 212' must be added. Thus, to increase the shelter length, transition modules 206' are added with corresponding increase in the area of the top central as at 214'. To increase the shelter width, transition modules 204' are added with corresponding increase in the area of the top central region as at 214". Lastly, to increase the height of the structure, transition modules 210' are added with corresponding additions of the girthwise modules 208' and 212'. Therefore, width, height and length may be controlled independently or in concert. Further, girthwise modules including not only the modules 208 and 210 but also the modules 210 may be omitted from the pattern as desired. The top central region need not be filled in with module structures as such addition of structure leads minimal additional rigidity and principally serves only to add weight to the structure, a feature not usually desirable. [FIG. 11 illustrates another possibility for controlling the shape or dimensions of the structure. In this case, however, the central portion of the Figure as indicated by the first arrow illustrates the simultaneous additions of all three transition modules 204, 206 and 210. The original faces 208 and 212 are preserved in this technique, as is the original top central region 202.

As indicated by the second arrow in the FIG. 11, a combination of the two techniques of FIG. 10 and the central portion of FIG. 11 yields still another possibility. It will be appreciated that the technique of FIG. 10 tends toward a cubic or rectangular polyhedral form whereas the technique of the central portion of FIG. 11 tend toward an octahedral form and, lastly, the technique of the right-hand side of FIG. 11 tends toward enlargement of the rhombicuboctahedral form.]

The covering material made be made of one piece and may include flaps with zipper or similar edge connections means for covering any openings or the like. Preferably, the covering material is attached to the framework at the hub means in the manner disclosed in any one of my prior patents and in order to allow the arch portions of the framework to separate for expansion or collapsing, the covering is also provided for such separation, even through it may be zipped up to effect the proper covering function when the framework is expanded.

What is claimed is:

1. In a portable shelter framework formed of elongated struts and which is capable of being expanded into arched three dimensional form and collapsed into bundled form, the combination of a plurality of series of end-interconnected module each defining a separate arch portion of the framework [said portions ] *at least one arch portion* extending in *a different,* [directions] *non-parallel and non-coplanar direction* relative to [each other,] to *a second arch portion, said modules, when expanded, comprising sides and ends defined by crossed, pivotally connected pairs of said elongated struts.*

2. In a portable shelter framework as defined in claim 1 wherein two of said arch portions extend in opposite directions relative to each other.

3. In a portable shelter framework as defined in claim 2 wherein [a third] *said second* arch portion extends in a direction perpendicular to the two of said arch portions.

4. In a portable shelter framework as defined in claim 3 wherein a fourth arch portion extends in a direction opposite to said [third] *second* arch portion.

5. [In a] *A* portable shelter framework [comprised of] *comprising:*

(*a*) a plurality of expanded, three dimensional modules distributed throughout the framework, each module including crossed pairs of elongated struts and pivot means pivotally joining said struts for allowing said modules to be manipulated between expanded, three dimensional form and strut-bundled form, (*b*) *a first and second arch portion of the framework, each said arch portion comprised of a* [the] combination of a plurality of series end-interconnected *expanded* modules *defining at least a first and second end of said arch portion* [each defining an arch portion of the framework], the modules of each arch portion being bounded on opposite sides of the arch *portion* by crossed, pivotally connected pairs of struts, [and]

(*c*) each *said* arch portion including at least one transition module which, when expanded, defines [rectilinear] *corners for polygonal* inner and outer faces of the [arch portion] *transition module* in which the *polygonal* inner face is of lesser area than that of said [rectilinear] *polygonal* outer face, (*d*) *the arch portions connected to each other at their first ends and extending in different, non-parallel and non-coplanar directions such that the second ends of the arch portions can be moved outwardly in different, non-parallel, non-coplanar directions to collapse the framework.*

6. In a portable shelter framework as defined in claim 5 wherein [each] *at least one* arch portion also includes a *substantially* vertically disposed end module forming a support for the framework.

7. [In a] *A* portable shelter framework comprising:

(*a*) *elongated struts arranged into modules such that said framework is capable of being expanded into three dimensional form and collapsed into bundled form in which said struts are disposed in closely spaced generally parallel relation,*

(*b*) *a series of said modules end-interconnected to define, when expanded at least one arch portion of the framework,*

(*c*) *said series of said modules comprising,*

(*1*) *a first module which, when expanded, defines inner and outer faces of the first module which are of the same area,*

(*2*) *a second module, which, when expanded, defines inner and outer faces of second module which are of areas of different from each other.*

(*d*) said [one module of said] *series of said modules further comprising a module* being *substantially* vertically disposed [to present an end thereof disposed in a definite supporting position relative to the expand framework, and], (*e*) *a first one of said arch portions in a non-parallel non-coplanar relationship with a second one of said arch portions,*

(*f*) said modules including *pairs of* crossed, pivotally connected struts and hub means pivotally joining ends of said pairs of struts for allowing collapse [and expansion] of said framework by extending said [one module] *vertically disposed module* of said series of *said* modules outwardly beyond [said supporting position thereof] *its substantially vertical disposition.*

8. In a portable shelter framework formed of elongated struts and which is capable of being expanded into three dimensional form and collapsed into bundled form in which struts are disposed in closely spaced, generally parallel relation, the combination of a series of end-interconnected modules defining an arch portion of the framework, the modules comprising said series of modules including at least one first module which when expanded defines inner and outer faces of the [arch portion] *first module* which are of the same rectangular area and at least one second module which when expanded defines inner and outer rectangular faces of the [arch] *second module* which are of areas different from each other, said first module defining inner and outer faces of said [arch portion] first module which are square.

9. In a portable shelter framework as defined in claim 8 wherein said first and second modules are circumscribed by crossed, pivotally connected struts of equal lengths.

10. In a portable shelter framework as defined in claim 9 wherein said first and second modules also [includes] *include* asymmetrically crossed, pivoted further pairs of struts extending inwardly from the hub means of each module, the inner ends of said further pairs of struts being joined by further hub means and serving to render each module self-locking in the expanded condition thereof.

11. In a portable shelter framework formed of elongated struts and which is capable of being expanded into three dimensional form and collapsed into bundled form in which struts are disposed in closely spaced, generally parallel relation, the combination of a series of end-interconnected modules defining an arch portion of the framework, the modules comprising said series of modules including at least one first module which when expanded defines inner and outer faces of the [arch portion] *first module* which are of the same rectangular area and at least one second module which, when expanded, defines inner and outer rectangular faces of the [arch] *second module* which are areas different from each other, said first and second modules are circumscribed by pairs of crossed, pivotally connected struts.

12. In a portable shelter framework as defined in claim 11 wherein the struts of said pairs are of the same length.

13. A framework for a portable shelter, said framework comprising:

(*a*) a plurality of pivotally interconnected elongate struts capable of relative movement between an expanded condition defining a three dimensional framework and a collapsed condition defining bundled struts, (*b*) [said struts forming] a plurality of strings of modules defining [an] *at least a first and second* arch portion of the *framework,*

(*c*) each arch portion *defining a first and second end,*

(*d*) *said second ends of said first and second arch portions each* having a foot adapted to rest upon a support surface upon which said three dimensional framework may stand, (*e*) [said feet being]*said arch portions connected at said first ends and* disposed in different, *non-parallel, non-coplanar directions* [positions in peripherally spaced relation to each other] to define a [supporting] base periphery of the three dimensional framework, (*f*) said feet capable of being extended beyond said base periphery to collapse the three dimensional framework, (*g*) [each] said [module] *modules* being of three dimensional form when the framework is expanded and [each module including ] *said modules comprising at least;*

(*1*) opposite *module* ends each formed by a pair of crossed, pivotally connected struts, (*2*) [and] opposite *module* sides each formed by a pair of crossed, pivotally connected struts, and (*3*) hub means pivotally joining adjacent [ends of each] pairs of struts.

14. A framework for a portable shelter as defined in claim 13 wherein modules of a first set of said modules are bounded by opposite sides and opposite ends in which the crossed, pivoted pairs of struts defining such sides and ends are symmetrically crossed and pivoted and modules of a second set of said modules are bounded by opposite sides and opposite ends in which the opposite sides of the modules of said second set are defined by pairs of struts which are asymmetrically crossed and pivoted and in which the opposite ends of the modules of said second set are defined by pairs of struts which are symmetrically crossed and pivoted, each arch portion being formed of a mixture of modules of said first and second sets thereof.

15. A framework for a portable shelter as defined in claim 14 wherein all of said struts are of the same length.

16. A framework for a portable shelter as defined in claim 15 wherein said framework when expanded includes a [stop] *top* central region to which said strings of modules are joined, said top central region being bonded by symmetrically crossed and pivoted pairs of said struts.

17. A framework for a portable shelter as defined in claim 16 wherein said top central region is bounded on all sides by arch portions.

18. A framework for a portable shelter as defined in claim 17 wherein said top central region is of square shape.

19. A framework for a portable shelter as defined in claim 14 wherein said framework when expanded includes a top central region to which said strings of modules are joined, said top central region being bounded by symmetrically crossed and pivoted pairs of said struts.

20. A framework for a portable shelter as defined in claim 19 wherein said top central region is bounded on all sides by arch portions.

21. A framework for a portable shelter as defined in claim 20 wherein said top central region is of square shape.

22. A framework for a portable shelter as defined in claim 13 wherein said framework when expanded includes a top central region to which said strings of modules are joined, said top central region being bounded by symmetrically crossed and pivoted pairs of said struts.

23. A framework for a portable shelter as defined in claim 22 wherein said top central region is bounded on all sides by arch portions.

24. A framework for a portable shelter as defined in claim 23 wherein said top central region is of square shape.

25. An expandable/collapsible framework for a portable shelter, said framework comprising a plurality of pairs of crossed, pivotally connected elongate struts and hub means pivotally connecting said pairs of struts in orthogonally patterned end-to-end relation to define a plurality of modules each expandable to three dimensional form and collapsible into a bundle of generally parallel struts, each module being bounded by opposite parallel sides and opposite ends in which a pair of said crossed, pivotally connected struts defines each of said opposite ends and each of said opposite sides, said framework when expanded having a base adapted to rest upon a supporting surface, an elevated top portion and a plurality of independently movable arch portions joined only to said top portion and extending archwise downwardly therefrom to define a plurality of independently movable archs terminating in supporting leg modules disposed in supporting leg positions in peripherally spaced relation around said base of the expanded framework, each arch portion comprising at least a string of said modules sharing common ends and corresponding common hub means and said strings being disposed such that the respective opposite sides of the modules of each string are disposed in planes which intersect the planes in which the opposite sides of the modules of the respective other strings lie whereby the framework is moveable between its collapsed and expanded conditions by moving said supporting leg modules outwardly beyond their supporting leg positions and then back to their supporting leg positions, and means for holding said framework in expanded condition.

26. An expandable/collapsible framework for a portable shelter as defined in claim 25 wherein modules of a first set of said modules are bounded by opposite sides and opposite ends in which the crossed, pivoted pairs of struts defining such sides and ends are symmetrically crossed and pivoted and modules of a second set of said modules are bounded by opposite sides and opposite ends in which the opposite sides of the modules of said second set are defined by pairs of struts which are asymmetrically crossed and pivoted and which the opposite ends of the modules of said second are defined by pairs of struts which are symmetrically crossed and pivoted, each arch portion being formed of a mixture of modules of said first and second sets thereof.

27. An expandable/collapsible framework for a portable shelter as defined in claim 26 wherein all of said struts are of the same length.

28. In a collapsible/expandable framework comprised of a plurality of joined modules and having a base and a [rectangular] top region in the expanded condition, the combination of [module means] *modules* defining a plurality of separations from said base to corners of said top region, *said separations defining an angle of less than 180° and greater than 0°*.

29. In a collapsible/expandable framework as defined in claim 28 including flexible material joined to said framework in covering relation thereto.

30. In a collapsible/expandable framework as defined in claim 28 wherein said modules are of rectangular form.

31. In a collapsible/expandable framework as defined in claim 30 wherein said modules are circumscribed by scissored pairs of struts.

32. In a collapsible/expandable framework as defined in claim 31 wherein all struts of said scissored pairs of struts are of the same length.

33. In a collapsible/expandable framework as defined in claim 32 wherein certain of said modules when expanded present inner and outer faces which are square and other of said modules when expanded present inner and outer faces which are of different areas.

34. In a collapsible/expandable framework as defined in claim 28 wherein said [module means] *modules* comprise arch portions of the expanded framework, at least one of said arch portions being defined by a first sequence of said modules arching downwardly from said top region adjacent a corner thereof and a further sequence of said modules joined along a vertically extending edge of said first sequence of modules in alignment with a corner of said top region.

35. In a collapsible/expandable framework as defined in claim 34 wherein another of said arch portions is defined by a third sequence of said modules arching downwardly from said top region adjacent said corner thereof, and means separably joining said third sequence to said further sequence in side-by-side relation.

36. In a collapsible/expandable framework as defined in claim 28 wherein at least one arch portion is located in bridging relation to one corner of the rectangular top region to define a triangular module at such corner, and including means for separably joining an apex of said triangular module to an adjacent module.

37. An expandable/collapsible framework for a portable shelter, said framework comprising a plurality of modules each expandable to three dimensional form and collapsible into a bundle;

each module comprising pairs of crossed, elongate struts, pivot means for pivotally connecting the struts of each crossed pair thereof in scissors-like fashion, and hub means pivotally connecting the opposite ends of each strut of each pair thereof to corresponding ends of individual struts of adjacent pairs thereof for allowing each module to be manipulated between a collapsed condition in which all of the struts of the module are in bundled, generally parallel relation and an expanded condition in which said pairs of struts are in patterned end-to-end relation;

said framework when expanded having an elevated, horizontally disposed top portion and a plurality of supporting leg portions which are joined to said top portion, extend downwardly therefrom and are spaced from each other;

said elevated, horizontally disposed top portion comprising a first plurality of said modules of the framework which share common struts and corresponding common hub means;

each supporting leg portion comprising at least a vertically extending string of a further plurality of said modules of the framework which share common ends and corresponding common hub means.

38. An expandable/collapsible framework as defined in claim 37 wherein said elevated, horizontally disposed top portion includes a continuous ring of said first plurality of modules which circumscribes the lower edge of the top portion of the framework and to which said supporting leg portions are joined.

39. An expandable/collapsible framework for a portable shelter, said framework comprising a plurality of modules each expandable to three dimensional form and collapsible into a bundle;

each module comprising four pairs of crossed, elongate struts in which all of such struts are of the same length, pivot means for pivotally connecting the struts of each crossed pair thereof in scissors-like fashion, and hub means pivotally connecting the opposite ends of each struts of each pair thereof to corresponding ends of individual struts of adjacent pairs thereof for allowing each module to be manipulated between collapsed condition in which all of the struts of the module are in bundled, generally parallel relation and expanded condition in which said four pairs of struts are in orthogonally patterned end-to-end relation with each module being bounded by opposite parallel sides and opposite ends in each of which sides and ends a pair of said crossed, pivotally connected struts defines a corresponding one of said opposite ends and of said opposite sides, a first type of said modules having those struts which bound its opposite sides and its opposite ends pivotally scissored about their mid points and a second type of said modules having those struts which bound its opposite ends pivotally scissored about their mid points and the pairs of struts which bound its opposite sides pivotally scissored in offset relation to their mid points;

said framework when expanded having an elevated, horizontally disposed top portion and a plurality of supporting leg portions joined to said top portion and extending downwardly therefrom;

said elevated, horizontally disposed top portion [comprising ] *bounded by* a plurality of modules of [both the first and] the second [types] *type* thereof; and each supporting leg portion comprising at least a vertically extending string of modules of both the first and second types thereof with the upper end of that module at the upper end of the string [sharing commons struts and corresponding common hub means with one module of] *bounding* said top portion.

40. An expandable/collapsible framework as defined in claim 39 wherein said elevated, horizontally disposed top portion includes a generally rectangular ring of modules circumscribing the lower edge of the top portion of the framework and to which said supporting leg portions are joined.

41. An expandable/collapsible framework as defined in claim 40 wherein said generally rectangular ring comprises four sets of modules joined in linear fashion and modules of said second type at the corners of the ring, said supporting leg portions being connected to the ring adjacent the corners thereof.

*42. A portable shelter framework as defined in claim 1 wherein said arch portions connect to define a top portion of the portable shelter framework.*

*43. A portable shelter framework as defined in claim 1 wherein at least one of said modules is self-locking.*

*44. A portable shelter framework as defined in claim 1 wherein at least one of said modules remains in an expanded three dimensional configuration by virtue of the asymmetrical geometry of that module.*

*45. A portable shelter framework as defined in claim 42 wherein said top portion is square.*

*46. A portable shelter framework as defined in claim 4 wherein at least one of said modules is self-locking.*

*47. A portable shelter framework as defined in claim 4 wherein at least one of said modules remains in an expanded three dimensional configuration by virtue of the asymmetrical geometry of that module.*

*48. A portable shelter framework as defined in claim 5 wherein at least one of the modules is self-locking.*

*49. A portable shelter framework as defined in claim 5 wherein at least one of the modules remains in an expanded three dimensional configuration by virtue of the asymmetrical geometry of that module.*

*50. A portable shelter framework as defined in claim 5 wherein said transition module, when expanded, comprises at least:*

*(a) first and second sides, said sides defining parallel planes, and*

*(b) first and second ends, said ends defining planes that intersect at a substantially perpendicular angle.*

*51. A portable shelter framework as defined in claim 5 wherein said transition module is directly connected to at least one other transition module at one corner of its polygonal outer face and one corner of its polygonal inner face.*

*52. A portable shelter framework as defined in claim 7 wherein at least one of said modules is self-locking.*

*53. A portable shelter framework as defined in claim 7 wherein at least one of said modules remains in an expanded three dimensional configuration by virtue of the asymmetrical geometry of that module.*

*54. A portable shelter framework as defined in claim 8 wherein at least one of said modules is self-locking.*

*55. A portable shelter framework as defined in claim 8 wherein at least one of said modules remains in an expanded three dimensional configuration by virtue of the asymmetrical geometry of that module.*

*56. A portable framework as defined in claim 11 in which a first one of said modules comprises at least a first and second pair of said crossed, pivotally connected struts on opposite sides of said first one of said modules, said first and second pairs of crossed, pivotally connected struts of said first one of said modules defining planes that intersect at a substantially perpendicular angle.*

*57. A portable framework as defined in claim 11 wherein at least one of said modules is self-locking.*

*58. A portable framework as defined in claim 11 wherein at least one of said modules remains in an expanded three dimensional configuration by virtue of the asymmetrical geometry of that module.*

*59. A portable framework as defined in claim 56 wherein at least one of said modules is self-locking.*

*60. A portable framework as defined in claim 56 wherein at least one of said modules remains in an expanded three dimensional configuration by virtue of the asymmetrical geometry of that module.*

*61. A portable framework as defined in claim 14 wherein said first and second sets of modules also include asymmetrically crossed, pivotally connected further pairs of struts*

*extending inwardly from said hub means of each module, the inner ends of said further pairs of struts being pivotally joined by further hub means and serving to render each module self-locking in the expanded condition thereof.*

*62. An expandable/collapsible framework for a portable shelter, said framework comprising:*

*(a) a plurality of pairs of crossed, pivotally connected elongate struts and hub means pivotally connecting said pairs of struts in orthogonally patterned end-to-end relation to define a plurality of modules,*

*(b) each of said modules expandable to three dimensional form and collapsible into a bundle of generally parallel struts, each module being bounded by opposite parallel sides and opposite ends,*

*(c) said framework, when expanded, defining*

*(1) a base,*

*(2) an elevated top portion,*

*(d) a plurality of arch portions comprised of said modules, joined only to said top portion, and extending archwise downwardly therefrom terminating in peripherally spaced relation to define said base of the expanded framework.*

*63. An expandable/collapsible framework for a portable shelter as defined in claim 25 wherein at least one of said modules is self-locking.*

*64. A collapsible/expandable framework as defined in claim 28 wherein at least one of said modules is self-locking.*

*65. A collapsible/expandable framework as defined in claim 28 wherein at least one of said modules remains in an expanded three dimensional configuration by virtue of the asymmetrical geometry of that module.*

*66. An expandable/collapsible framework as defined in claim 37 wherein at least one of said modules is self-locking.*

*67. An expandable/collapsible framework as defined in claim 37 wherein at least one of said modules remains in an expanded three dimensional configuration by virtue of the asymmetrical geometry of that module.*

*68. A portable shelter framework comprising:*

*(a) A first type of module comprising at least,*

*(1) opposing first and second sides and first and second ends of said first type of module, said first and second sides and first and second ends of said first type of module defined by crossed pairs of pivotally interconnected struts of said first type of module,*

*(2) said crossed pairs of pivotally interconnected struts defining said first and second sides of said first type of module being symmetrically crossed,*

*(3) said crossed pairs of pivotally interconnected struts defining said first and second ends of said first type of module being symmetrically crossed,*

*(b) a second type of module comprising as least,*

*(1) opposing first and second sides and first and second ends of said second type of module, said first and second sides and first and second ends of said second type of module defined by crossed pairs of pivotally interconnected struts of said second type of module,*

*(2) said crossed pairs of pivotally interconnected struts defining said first and second sides of said second type of module being asymmetrically crossed,*

*(3) said crossed pairs of pivotally interconnected struts defining said first and second ends of said second type of module being symmetrically crossed,*

*(c) A string of said first type of module and said second type of module end-interconnected and arranged such that a first one of said second type of module is end-interconnected between a first one and a second one of said first type of module.*

*69. A portable shelter framework as defined in claim 68 wherein at least one of said first type of module is self-locking.*

*70. A portable shelter framework as defined in claim 68 wherein at least one of said second type of module is self-locking.*

*71. A portable shelter framework as defined in claim 68 wherein at least one of said first type of module remains in an expanded three dimensional configuration by virtue of the asymmetrical geometry of that module.*

*72. A portable shelter framework as defined in claim 68 wherein at least one of said second type of module remains in an expanded three dimensional configuration by virtue of the asymmetrical geometry of that.*

*73. A portable shelter framework comprising:*

*(a) a first type of module comprising at least,*

*(1) a first face of said first type of module,*

*(2) a second face of said first type of module,*

*(3) opposing sides and ends of said first type of module defined by crossed pairs of pivotally interconnected struts of said first type of module,*

*(4) said first face of said first type of module having an area substantially equal to the area of said second face of said second type of module,*

*(b) a second type of module comprising at least,*

*(1) a first face of said second type of module,*

*(2) a second face of said second type of module,*

*(3) opposing sides and ends of said second type of module defined by crossed pairs of pivotally interconnected struts of said second type of module,*

*(4) said first face of said second type of module having an area greater than the area of said second face of said second type of module,*

*(c) a string of said first type of module and said second type of module end-interconnected and arranged such that a first one of said second type of module is end-interconnected between a first one and a second one of said first type of module,*

*(d) the first face of said first one of said first type of module defining a plane that is substantially perpendicular to the plane defined by the first face of said second one of said first type of module.*

*74. A portable shelter framework as defined in claim 73 wherein at least one of said first type of module is self-locking.*

*75. A portable shelter framework as defined in claim 73 wherein at least one of said second type of module is self-locking.*

*76. A portable shelter framework as defined in claim 73 wherein at least one of said first type of module remains in an expanded three dimensional configuration by virtue of the asymmetrical geometry of that module.*

*77. A portable shelter framework as defined in claim 73 wherein at least one of said second type of module remains in an expanded three dimensional configuration by virtue of the asymmetrical geometry of that module.*

*78. A portable shelter framework as defined in claim 68 wherein the plane defined by the first end of said first one of said second type of module is perpendicular to the plane defined by the second end of the first one of said second type of module.*

*79. A portable shelter framework comprising:*

*(a ) A first type of module comprising at least,*

*(1) opposing first and second sides and first and second ends of said first type of module, said first and second sides and first and second ends of said first type of*

*module defined by crossed pairs of pivotally interconnected struts of said first type of module,*

*(2) said crossed pairs of pivotally interconnected struts defined said first and second sides of said first type of module being symmetrically crossed,*

*(3) said crossed pairs of pivotally interconnected struts defining said first and second ends of said first type of module being symmetrically crossed,*

*(b) a second type of module comprising at least,*

*(1) opposing first and second sides and first and second ends of said second type of module, said first and second sides and first and second ends of said second type of module defined by crossed pairs of pivotally interconnected struts of said second type of module,*

*(2) said crossed pairs of pivotally interconnected struts defining said first and second sides of said second type of module being asymmetrically crossed,*

*(3) said crossed pairs of pivotally interconnected struts defining said first and second ends of said second type of module being symmetrically crossed,*

*(c) A string of said first type of module and said second type of module end-interconnected and arranged such that a first one of said first type of module is end-interconnected, between a first one and a second one of said second type of module.*

*80. A portable shelter framework comprising:*

*(a ) a first type of module comprising at least,*

*(1) a first face of said first type of module,*

*(2) a second face of said first type of module,*

*(3) opposing sides and ends of said first type of module defined by crossed pairs of pivotally interconnected struts of said first type of module,*

*(4) said first face of said first type of module having an area substantially equal to the area of said second face of said second type of module,*

*(b) a second type of module comprising at least,*

*(1) a first face of said second type of module,*

*(2) a second face of said second type of module,*

*(3) opposing sides and ends of said second type of module defined by crossed pairs of pivotally interconnected struts of said second type of module,*

*(4) said first face of said second type of module having an area greater than the area of said second face of said second type of module,*

*(c) a string of said first type of module and said second type of module end-interconnected and arranged such that a first one of said first type of module is end-interconnected between a first one and a second one of said second type of module,*

*(d) the first face of said first one of said second type of module defining a plane that is substantially perpendicular to the plane defined by the first face of said second one of said second type of module.*

* * * * *